United States Patent
Choi et al.

(10) Patent No.: US 10,550,818 B2
(45) Date of Patent: Feb. 4, 2020

(54) APPARATUS AND METHOD FOR CONTROLLING START SEQUENCE OF ENGINE FOR VEHICLE

(71) Applicants: Hyundai Motor Company, Seoul (KR); Kia Motors Corporation, Seoul (KR)

(72) Inventors: Kwang-Seok Choi, Hwaseong-si (KR); Do-Sung Hwang, Gunpo-si (KR); Jeong-Hye Choi, Suwon-si (KR); Ki-Hong Kang, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 150 days.

(21) Appl. No.: 15/839,425

(22) Filed: Dec. 12, 2017

(65) Prior Publication Data
US 2018/0298862 A1    Oct. 18, 2018

(30) Foreign Application Priority Data
Apr. 12, 2017    (KR) .................. 10-2017-0047349

(51) Int. Cl.
*F02N 11/08*    (2006.01)
*F02N 11/06*    (2006.01)
(Continued)

(52) U.S. Cl.
CPC .......... *F02N 11/0866* (2013.01); *F02N 11/06* (2013.01); *F02N 11/0803* (2013.01);
(Continued)

(58) Field of Classification Search
CPC ............... F02N 11/003; F02N 11/0866; F02N 2011/0888; F02N 2011/0896
See application file for complete search history.

(56) References Cited

U.S. PATENT DOCUMENTS

| | | | | |
|---|---|---|---|---|
| 5,710,699 A | * | 1/1998 | King | H02P 23/06 363/132 |
| 5,869,950 A | * | 2/1999 | Hoffman, Jr. | B60K 6/28 320/103 |

(Continued)

FOREIGN PATENT DOCUMENTS

| | | |
|---|---|---|
| KR | 10-2005-0001673 A | 1/2005 |
| KR | 10-2005-0036185 A | 4/2005 |

(Continued)

*Primary Examiner* — Kevin R Steckbauer
(74) *Attorney, Agent, or Firm* — Morgan, Lewis & Bockius LLP

(57) ABSTRACT

An apparatus for controlling a start sequence of an engine for a vehicle may include an engine, a motor configured to start the engine, a main switch configured to connect power to the motor or interrupt the power to be supplied to the motor, a main battery configured to supply the power to the motor through the main switch, a converter configured to step up a voltage of the motor by boosting reverse power through a reverse control operation, an auxiliary battery configured to supply the reverse power, and a converter controller configured to perform a pre-charging operation for a predetermined time through the reverse control operation when an ignition-ON signal is inputted, and close the main switch when the pre-charging operation is completed.

20 Claims, 3 Drawing Sheets

(51) Int. Cl.
*F02N 11/00* (2006.01)
*H02J 1/00* (2006.01)
(52) U.S. Cl.
CPC ....... *F02N 11/00* (2013.01); *F02N 2011/0874* (2013.01); *F02N 2011/0888* (2013.01); *F02N 2011/0896* (2013.01); *H02J 2001/008* (2013.01)

(56) References Cited

U.S. PATENT DOCUMENTS

| | | | | |
|---|---|---|---|---|
| 6,794,847 B2* | 9/2004 | Hosoda | | B60K 6/28 320/104 |
| 6,923,279 B2* | 8/2005 | Shimane | | B60K 6/28 180/65.1 |
| 7,199,551 B2* | 4/2007 | Gauthier | | B60K 6/445 320/104 |
| 7,267,090 B2* | 9/2007 | Tamai | | B60L 58/24 123/179.3 |
| 7,938,092 B2* | 5/2011 | Yang | | F02N 11/0866 123/179.28 |
| 8,319,472 B2* | 11/2012 | Gibbs | | F02N 11/0866 307/10.6 |
| 8,467,924 B2* | 6/2013 | Shiba | | B60K 6/445 701/22 |
| 8,473,136 B2* | 6/2013 | Kato | | B60W 10/26 701/22 |
| 9,458,813 B2* | 10/2016 | Sekiguchi | | B60L 7/10 |
| 9,493,091 B2* | 11/2016 | Kim | | B60L 58/20 |
| 9,561,792 B2* | 2/2017 | Kodawara | | B60L 58/20 |
| 9,856,847 B2* | 1/2018 | Sekiguchi | | F02N 11/0866 |
| 9,944,199 B2* | 4/2018 | Tahara | | F02D 17/00 |
| 10,029,572 B2* | 7/2018 | Sakatani | | B60R 16/03 |
| 10,076,971 B2* | 9/2018 | Huang | | B60L 58/12 |
| 10,160,325 B2* | 12/2018 | Lee | | B60L 3/0046 |
| 2002/0101217 A1* | 8/2002 | Hosoda | | B60K 6/28 320/124 |
| 2003/0029654 A1* | 2/2003 | Shimane | | B60K 6/28 180/65.29 |
| 2005/0068003 A1* | 3/2005 | Gauthier | | B60K 6/445 320/104 |
| 2006/0058897 A1* | 3/2006 | Senda | | B60R 16/03 700/22 |
| 2007/0113814 A1* | 5/2007 | Tamai | | B60L 58/20 123/179.3 |
| 2010/0181959 A1* | 7/2010 | Gibbs | | F02N 11/0866 320/104 |
| 2010/0319646 A1* | 12/2010 | Yang | | F02N 11/0866 123/179.28 |
| 2011/0082611 A1* | 4/2011 | Shiba | | B60K 6/445 701/22 |
| 2015/0001857 A1* | 1/2015 | Sekiguchi | | B60L 7/10 290/38 C |
| 2015/0298571 A1* | 10/2015 | Kim | | B60L 58/20 701/22 |
| 2016/0107635 A1* | 4/2016 | Kodawara | | B60L 58/20 701/22 |
| 2017/0030316 A1* | 2/2017 | Sekiguchi | | F02N 11/0866 |
| 2017/0106758 A1* | 4/2017 | Sakatani | | B60R 16/033 |
| 2017/0158058 A1* | 6/2017 | Lee | | B60L 3/0046 |
| 2017/0158082 A1* | 6/2017 | Tahara | | F02D 17/00 |
| 2018/0252195 A1* | 9/2018 | Ciaccio | | H01M 10/4207 |
| 2018/0252774 A1* | 9/2018 | Ciaccio | | H01M 10/4207 |
| 2018/0298862 A1* | 10/2018 | Choi | | F02N 11/0803 |
| 2019/0184972 A1* | 6/2019 | Kim | | B60W 20/13 |

FOREIGN PATENT DOCUMENTS

KR 10-2014-0072522 A 6/2014
KR 10-1459791 B1 11/2014

\* cited by examiner

APPARATUS AND METHOD FOR CONTROLLING START SEQUENCE OF ENGINE FOR VEHICLE

CROSS-REFERENCE(S) TO RELATED APPLICATIONS

The present application claims priority to Korean Patent Application No. 10-2017-0047349, filed on Apr. 12, 2017, the entire contents of which is incorporated herein for all purposes by this reference.

BACKGROUND OF THE INVENTION

Field of the Invention

The present invention relates to a technique for controlling a start sequence of an engine for a vehicle; and, more particularly, the present invention relates to an apparatus and a method for controlling a start sequence of an engine for a vehicle which allows an engine start to be possible despite not using a pre-charging device and circuit.

Description of Related Art

Generally, a maximum power capacity (e.g., approximately 2.5 kW) of an auxiliary battery (e.g., having an output voltage of approximately 12 V), which supplies power to various electric loads, or the like, is limited.

However, as development and application of advanced components increases due to internal factors, electricity consumption increases accordingly. Furthermore, as external factors, improvement in fuel efficiency, reinforcement of exhaust gas regulations, or ease of driving has been required.

Therefore, when power higher than the power provided by the auxiliary battery is required, not only the auxiliary battery but also a main battery having a different power supply system (e.g., providing an output voltage of approximately 41 V or 48 V) is used.

A vehicle having such a structure is called a Mild-Hybrid Electric Vehicle (HEV) or a Soft-HEV.

In the case of a typical HEV, when a key start signal is inputted, a pre-charging operation, and a main relay close operation are successively performed, and the vehicle begins to move using a motor. The pre-charging operation is performed for up to approximately 1.5 seconds.

However, the mild-HEV or the soft-HEV has a configuration wherein, to begin movement of the vehicle, the engine must start after the key start signal is inputted, the pre-charging operation is performed, and then a main battery relay is closed. That is, unless the engine starts, it is impossible to move the vehicle.

Consequently, in the mild-HEV or the soft-HEV, a sequence configured for preparing a start of the engine within a short time period is required.

The information disclosed in the present Background of the Invention section is only for enhancement of understanding of the general background of the invention and should not be taken as an acknowledgment or any form of suggestion that the present information forms the prior art already known to a person skilled in the art.

BRIEF SUMMARY

Various aspects and exemplary embodiments of the present invention are directed to providing an apparatus and a method for controlling a start sequence of an engine for a vehicle which can prepare a start of the engine within a short time period so that a time taken to start the engine can be reduced.

Various aspects of the present invention are directed to providing an apparatus and a method for controlling a start sequence of an engine for a vehicle which does not need a separate pre-charging element and/or circuit, thus making it possible to reduce the production cost.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

Various aspects of the present invention are directed to providing an apparatus for controlling a start sequence of an engine for a vehicle which can prepare a start of an engine within a short time period so that a time taken to start an engine can be reduced.

In accordance with various exemplary embodiments of the present invention, there is provided an apparatus for controlling a start sequence of an engine for a vehicle, including an engine; a motor configured to start the engine; a main switch configured to connect power to the motor or interrupt the power to be supplied to the motor; a main battery configured to supply the power to the motor through the main switch; a converter configured to step up a voltage of the motor by boosting reverse power through a reverse control operation; an auxiliary battery configured to supply the reverse power; and a converter controller configured to perform a pre-charging operation for a predetermined time period through the reverse control operation when an ignition-ON signal is inputted, and close the main switch when the pre-charging operation is completed.

The converter controller may include an execution module configured to perform the pre-charging operation; a determination module configured to determine whether the power provided from the main battery reaches a predetermined reference value after the pre-charging operation has been completed; and a control module configured to close the main switch when the power has reached the predetermined reference value as a result of the determination.

The motor may be coupled to a crankshaft of the engine by a connection device.

The connection device may include a belt or a chain.

The main battery may include a supercapacitor or a lithium-ion battery, and the auxiliary battery may include a lead acid battery.

The motor may include an inverter-integrated Mild Hybrid Starter and Generator (MHSG).

The converter may include a bidirectional Low voltage Direct current-direct current Converter (LDC).

The main switch may include any one of a power relay, a semiconductor switching element, a thyristor, a gate turn-OFF (GTO) thyristor, a triode for alternating current (TRIAC), a silicon controlled rectifier (SCR), and an integrated circuit (IC).

The reverse control operation may include an operation of stepping up a voltage from 12 V to 48 V.

The apparatus may further include a controller configured to verify that the main switch is in a closed state when a key start signal is inputted after the pre-charging operation has been completed, and immediately operate the motor so that the engine starts.

In accordance with various exemplary embodiments of the present invention, there is provided a method for controlling a start sequence of an engine for a vehicle, including: performing, by a converter controller, a pre-charging operation for a predetermined time period through a reverse control operation when an ignition-ON signal is inputted; stepping up, by a converter, a voltage to be applied to a motor by boosting reverse power provided from the auxiliary battery according to the reverse control operation; closing, by the converter controller, a main switch when the pre-charging operation is completed; and supplying power from the main battery to the motor through the main switch to start the engine.

The closing of the main switch may include determining, by a determination module, whether the power provided from the main battery reaches a predetermined reference value after the pre-charging operation is completed; and closing, by a control module, the main switch when the power has reached the predetermined reference value as a result of the determining.

The supplying of the power may include checking, by a controller, that the main switch is in a closed state when a key start signal is inputted after the pre-charging operation has been completed, and immediately operating the motor so that the engine starts.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
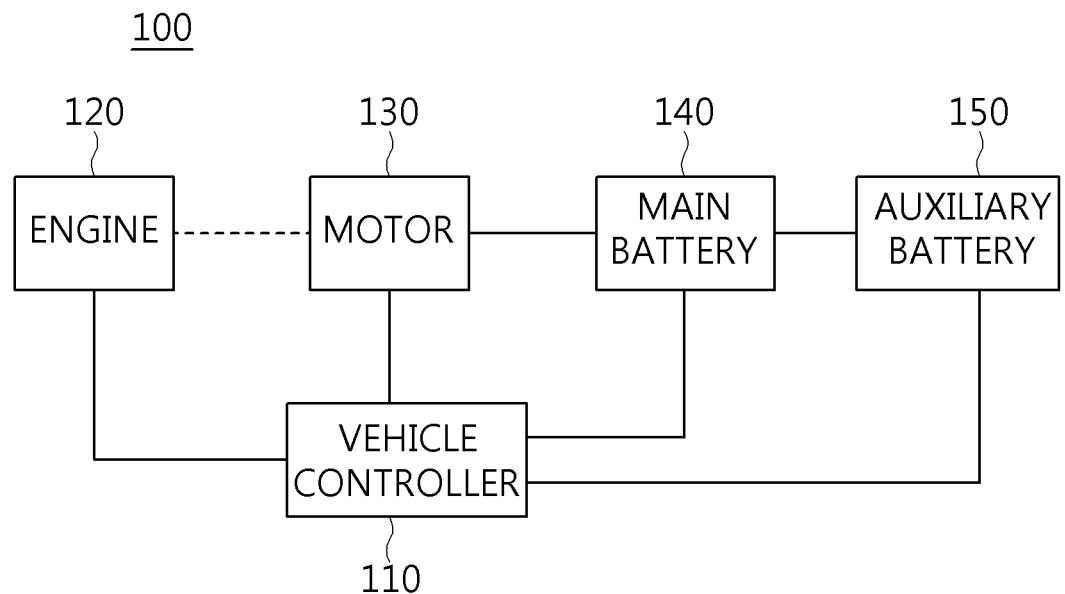
FIG. 1 is a diagram illustrating a configuration of an apparatus for controlling a start sequence of an engine for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and the shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined in the appended claims.

It will be understood that, although the terms "first", "second", etc. may be used herein to describe various elements, these elements should not be limited by these terms. These terms are only used to distinguish one element from another element.

For instance, a first element discussed below could be termed a second element without departing from the teachings of the present invention. Similarly, the second element could also be termed the first element. The term "and/or" includes any and all combinations of one or more of the associated listed items.

Unless otherwise defined, all terms including technical and scientific terms used herein have the same meaning as commonly understood by one of ordinary skill in the art to which the present invention belongs.

It will be further understood that terms used herein should be interpreted as having a meaning which is consistent with their meaning in the context of the present embodiment and the relevant art and will not be interpreted in an idealized or overly formal sense unless expressly so defined herein.

Hereinafter, an apparatus and a method for controlling a start sequence of an engine for a vehicle according to an exemplary embodiment of the present invention will be described with reference to the attached drawings.

FIG. 1 is a diagram illustrating the configuration of an apparatus 100 for controlling a start sequence of an engine for a vehicle according to an exemplary embodiment of the present invention. Referring to FIG. 1, the sequence controlling apparatus 100 may include a controller 110 which is configured to exchange signals and data between components disposed in the vehicle and controls the signals and the data, an engine 120, a motor 130 which is coupled with a crankshaft of the engine 120 through a connection device and generates electricity or starts the engine 120, a main battery 140 which supplies power to the motor 130, and an auxiliary battery 150 which supplies reverse power to the main battery 140 by a reverse control operation.

The controller 110 is configured to drive the motor 130 for starting the engine, or controls the motor 130 wherein the motor 130 generates electricity by the operation of the engine 120. The controller 110 may be electrically coupled with the main battery 140 and the auxiliary battery 150 to receive state information related to the main battery 140 and/or the auxiliary battery 150 and analyze the state information.

Furthermore, the controller 110 checks the amount of charge using state information related to the auxiliary battery 150, and may perform a limp-home control mode rather than performing a generation control mode when an amount of charge is less than a reference value. The auxiliary battery state information may include state of charge (SOC) information, state of health (SOH) information, depth of discharging (DOD) information, and state of function (SOF) information.

The engine 120 may be a continuous variable valve timing (CVVT) engine, a double overhead camshaft (DOHC) engine, a continuous valve timing (CVT) engine, a gasoline direct injection (GDI) engine, or a multi-point injection (MPI) engine, which utilizes gasoline as fuel, a common rail direct injection (CRDI) engine, a high direction turbo intercooler (HTI) engine, or a variable geometry turbocharger (VGT) engine, which utilizes diesel as fuel, or a liquid propane injection (LPI) engine, which utilizes gas as fuel.

The motor 130 may be configured as a start motor which starts the engine 120 by rotating a crank shaft of the engine 120 or be configured as a generating motor which generates three-phase alternating current (AC) power. The motor 130, which is a device including a circuit, may be an inverter-integrated Mild Hybrid Starter and Generator (MHSG). Furthermore, the motor 130 may be configured to include an inverter function. Therefore, it is possible to convert three-phase alternating current (AC) power generated in the motor 130 into direct current (DC) power and output the DC power, or convert DC power into three-phase AC power and drive the motor 130. A capacitor is provided in the inverter.

In the present case, when the main battery 140 is connected to the capacitor which is in a state in which no voltage is applied thereto, inrush current of several amperes (A) or more is applied to the capacitor because the internal resistance thereof is very low. To prevent the foregoing problem, in an exemplary embodiment of the present invention, an operation of stepping up the voltage of the motor 130 to the same voltage as the output voltage of the main battery 140 through pre-charging is performed.

Unlike a full hybrid electric vehicle (HEV) motor, the motor 130 is formed of a permanent magnet and an electromagnet. That is, a stator may include a permanent magnet, and a rotor may include an electromagnet. To drive the motor 130, exciting current is first applied to the motor 130 to magnetize the electromagnet of the rotor.

The engine 120 and the motor 130 are coupled with each other by a connection device including a belt or a chain. Hence, in the case of a general operation mode, even when the engine 120 is driven, the motor 130 does not generate electricity. That is, exciting current may be applied to the motor 130 so that the rotor of the motor 130 is magnetized, wherein the motor 130 can begin to generate electricity.

Operation of the motor 130 is required for starting the engine 120. The motor 130 is operated by power supplied from the main battery 140. During the present operation of the motor 130, the connection device including the belt rotates the engine 120 that has been in a stopped state.

The main battery 140 may be a supercapacitor or a lithium-ion battery. Furthermore, the main battery 140 may be a high-voltage battery including a nickel metal battery, a lithium polymer battery, or an all-solid-state battery, for electric vehicles. The supercapacitor may also be called an ultracapacitor or an extra-high-capacity storage battery. The supercapacitor refers to an electronic component using a charging phenomenon by simple movement of ions to an electrode and an electrolyte interface or surface chemical reaction.

The main battery 140 may be formed of a single battery cell or a battery pack in which battery cells are disposed in series and/or parallel to each other.

The battery cell may be designed to be a cylindrical cell, a prismatic cell, or a pouch type cell. The pouch type cell may include a flexible cover formed of a thin film, and electrical components for the battery cell are disposed in the cover.

To achieve the optimum volume application in a single battery cell, pouch type cells are used. The pouch type cells are characterized in that they can provide high capacity despite having a low weight.

The edge portions of the above-mentioned pouch type cells include sealing joints. More specifically, each sealing joint couples two thin films of battery cells, and additional components are included in a cavity region defined by the coupled thin films.

Referring to FIG. 1, the output voltage of the main battery 140 may be approximately 48 V, but the present invention is not limited thereto.

The auxiliary battery 150 may be a lead acid battery, but the present invention is not limited thereto. For example, a nickel metal battery, a lithium polymer battery, or a lithium-ion battery may be used as the auxiliary battery 150. The output voltage of the auxiliary battery 150 may be approximately 12 V, but the present invention is not limited thereto.

The auxiliary battery 150 may be charged by the charging power supplied from the main battery 140. Supplying reverse charging power to the main battery 140 is plausible.

Figure 2:
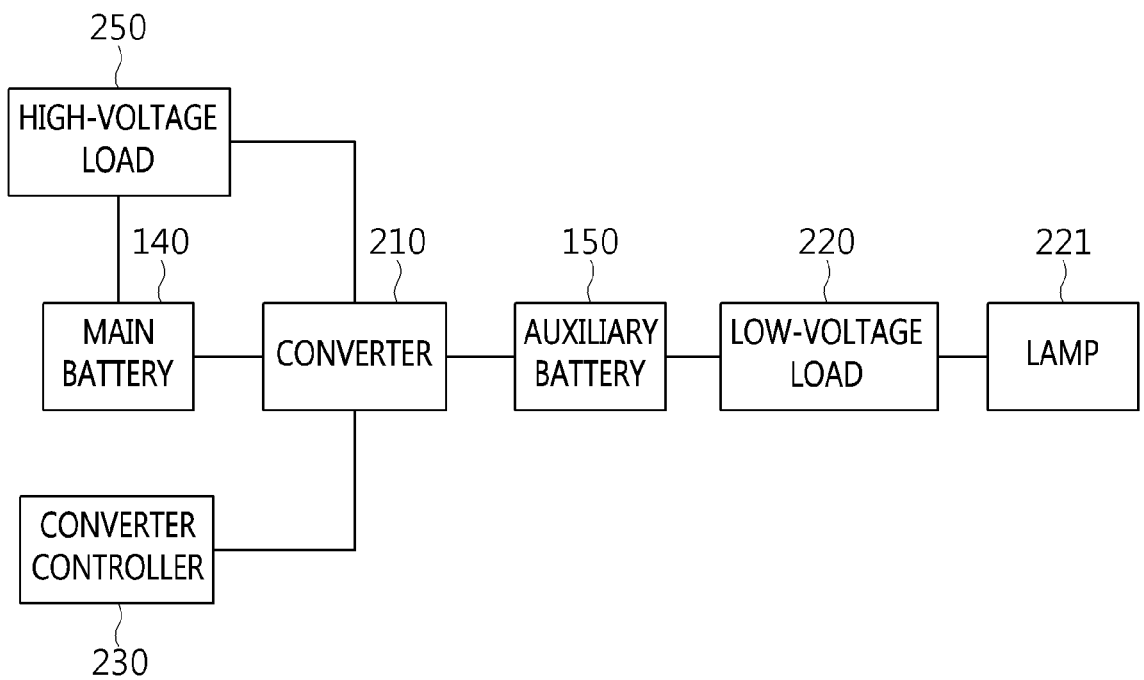
FIG. 2 is a diagram illustrating a configuration of a converter and an electric load coupled with the sequence controlling apparatus shown in FIG. 1.

FIG. 2 is a diagram illustrating a configuration of a converter and an electric load coupled with the sequence controlling apparatus shown in FIG. 1. Referring to FIG. 2, a converter 210, a converter controller 230 configured to control the converter 210, and a high-voltage load 250 configured to receive power from the main battery 140 are provided between the main battery 140 and the auxiliary battery 150.

The converter 210 may be a bidirectional converter and perform a step-down or step-up operation. The main battery 140 performs a normal direction control function. The converter 210 regulates normal-direction power supplied from the main battery 140 and supplies it to the auxiliary battery 150. For example, in the case of the normal-direction control operation, the converter 210 steps down a voltage of 48 V to a voltage of 12 V and supplies the step down voltage to the auxiliary battery 150.

Unlike the above case, to perform a pre-charging operation for starting the engine (refer to 120 of FIG. 1), a reverse control operation may be performed. For the present operation, the converter 210 regulates reverse-direction power supplied from the auxiliary battery 150 and supplies the power to the main battery 140 and/or the high-voltage load 250. For example, in the case of the reverse-direction control operation, the converter 210 steps up a voltage of 12 V to a voltage 48 V, and supplies the step up voltage to the main battery 140 and/or the high-voltage load 250.

Therefore, the converter 210 is a bidirectional converter, and a DC-DC converter may be used as the converter 210. A bidirectional LDC (low voltage DC-DC) converter may be used as the converter 210. The converter 210 includes a boost circuit for stepping up the voltage and a buck circuit for stepping down the voltage.

The auxiliary battery 150 supplies power to a low-voltage load 220. Examples of the low-voltage load 220 may include electric components including a lamp 221. When the vehicle is in the limp-home control mode, the lamp 221 may function as a service lamp for indicating the limp-home control mode.

Although the converter controller 230 has been illustrated separately from the controller 110 in FIG. 2, the converter controller 230 may be integrally provided in the controller 110.

Figure 3:
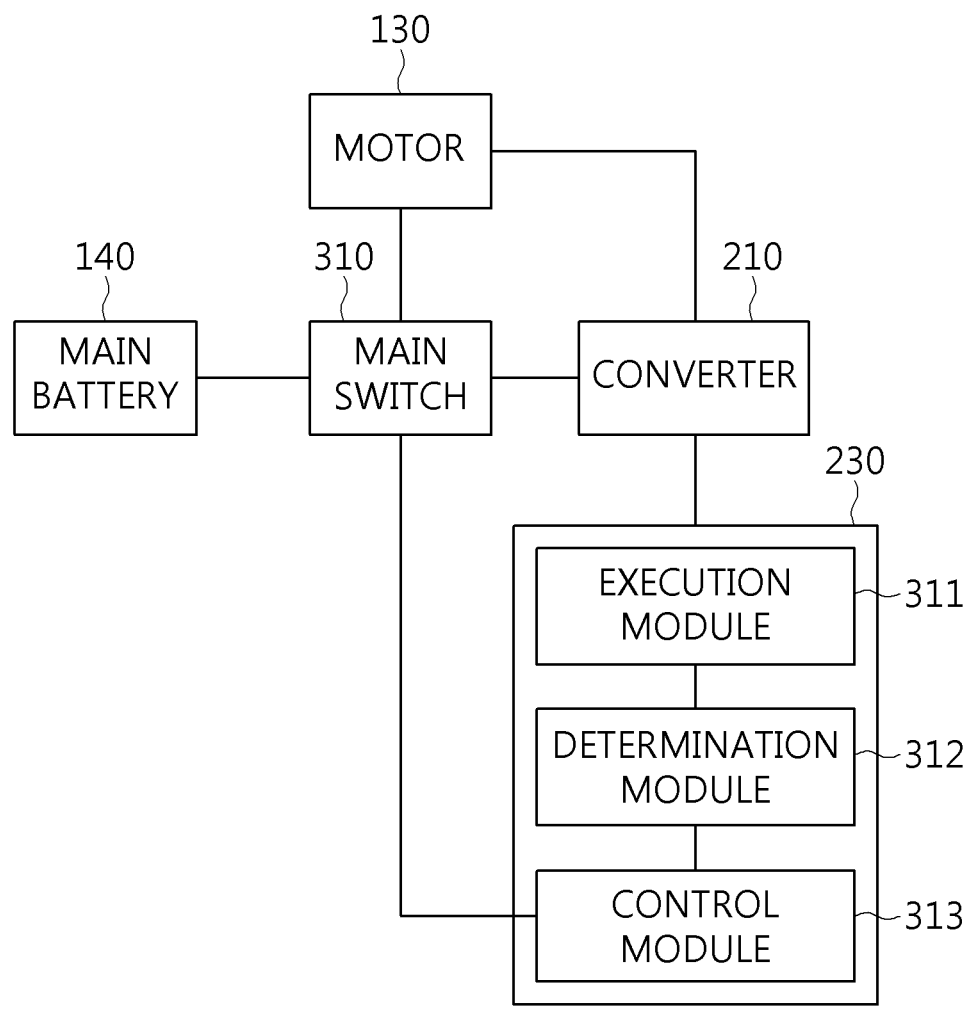
FIG. 3 is a view showing a detailed configuration of a converter controller shown in FIG. 1.

FIG. 3 is a view showing a detailed configuration of the converter controller 230 shown in FIG. 1. A full HEV (hybrid electric vehicle) uses, to perform a pre-charging operation, a pre-charging circuit including a pre-charging relay provided separately from a main relay. After the pre-charging operation has been performed through the pre-charging relay, the main relay is closed.

The pre-charging circuit is a circuit for preventing the main relay adjacent to the high-voltage battery from being fused when current higher than normal current flows at the moment at which the high-voltage battery is coupled with a 48V-powernet load circuit (e.g., the motor 130). In the present structure, the pre-charging relay is closed before the battery-side main relay is closed. Thus, the battery-side main relay is closed after the voltage of the 48V-powernet load circuit has been increased to 48 V which is the same as or substantially the same as that of the high-voltage battery. The main relay can be prevented from being fused.

However, the exemplary embodiment of the present invention has a structure configure for removing such a pre-charging relay. Referring to FIG. 3, only a main switch 310 is provided between the main battery 140 and the motor 130 which belongs to the high-voltage load 250 shown in FIG. 2. Therefore, a voltage of 48 V may be applied by the reverse control operation (12 V→48 V) to the circuit of the motor 130 which is provided in the load circuit. Thereafter, when the voltage to be applied to the motor 130 which is the high-voltage load is increased to 48 V, the converter controller 230 may be configured to close the main switch 310 to couple the high-voltage battery 210 to the motor 130 which is the 48V-powernet load circuit.

The main switch 310 may be a power relay, a semiconductor switching element, a thyristor, a gate turn-OFF (GTO) thyristor, a triode for alternating current (TRIAC), a silicon controlled rectifier (SCR), an integrated circuit (IC), or the like. The semiconductor switching element may be a field effect transistor (FET), a metal oxide semiconductor FET (MOSFET), an insulated gate bipolar mode transistor (IGBT), a power rectifier diode, or the like.

Referring to FIG. 3, the converter controller 230 may include an execution module 311 configured to perform the pre-charging operation, a determination module 312 configured to determine whether power provided from the main battery reaches a predetermined reference value after the pre-charging operation has been completed, and a control module 313 configured to close the main switch when the power has reached the predetermined reference value.

Figure 4:
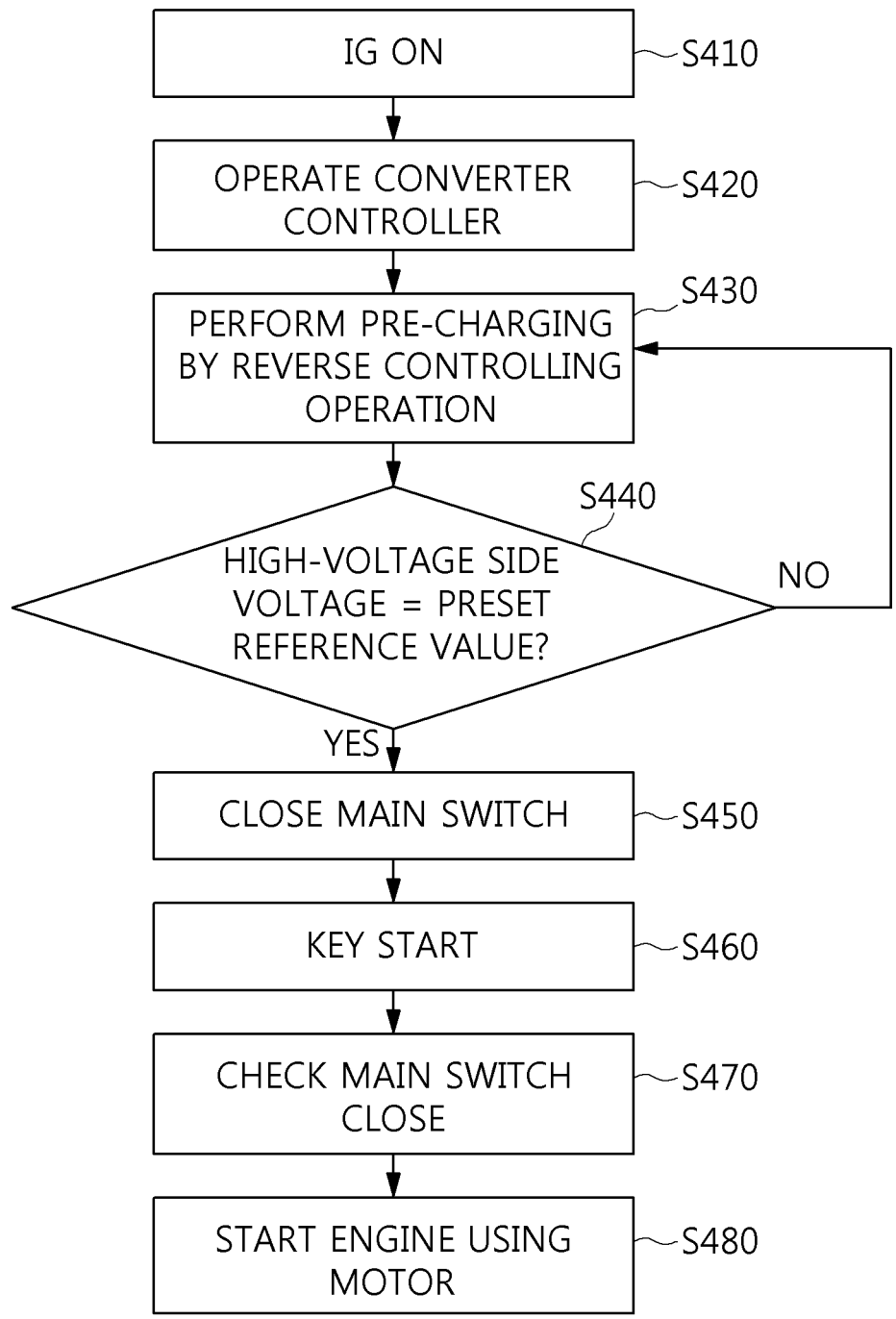
FIG. 4 is a flowchart showing a process of controlling a start sequence of an engine for a vehicle to reduce the time taken to start the engine according to an exemplary embodiment of the present invention.

FIG. 4 is a flowchart showing a process of controlling a start sequence of an engine for a vehicle to reduce the time taken to start the engine according to an exemplary embodiment of the present invention. Referring to FIG. 4, when a driver inputs, using a vehicle key, an ignition-ON signal of the vehicle that has been in a stopped state, the converter controller 230 begins to operate, (S410 and S420).

As the ignition-ON signal is inputted, the converter (refer to 210 of FIG. 3) performs a pre-charging operation for a predetermined time period through a reverse control operation according to a command of the converter controller 230, (S430).

Subsequently, the converter 210 steps up reverse power supplied from the auxiliary battery (refer to 150 of FIG. 2) according to the reverse control operation and charges a high-voltage load (e.g., the motor 130).

After the pre-charging operation has been completed, the converter controller 230 determines whether the voltage of the high-voltage load reaches a predetermined reference value, (S440). For instance, the converter controller 230 determines whether the voltage outputted from the motor 130 reaches the predetermined reference value (e.g., an approximately 48 V).

As a result of determination (S440), when the power outputted from the high-voltage load 250 does not reach the predetermined reference value, S430 and S440 are repeatedly performed so that the pre-charging operation is performed again.

As a result of determination (S440), when the power outputted from the high-voltage load 250 has reached the predetermined reference value, the converter controller 230 closes the main switch (refer to 310 of FIG. 3) (S450).

Thereafter, when the driver inputs a key start signal, the controller (refer to 110 of FIG. 1) checks that the main switch (refer to 310 of FIG. 3) is in a closed state, and immediately operates the motor 130 so that the engine 120 starts (S460, S470, and S480).

Each of the terms including "module" and "controller" written in the drawings signifies a device configured for processing at least one function or operation, and the device may be embodied by hardware, software or a combination of hardware and software.

Furthermore, the hardware may be embodied by a device designed to perform the foregoing function, for example, by an application specific integrated circuit (ASIC), a digital signal processing (DSP) device, a programmable logic device (PLD), a microprocessor, other electronic devices, or a combination thereof. The software may be embodied by a module configured to perform the foregoing function. The software may be stored in a memory device and performed by a processor. The memory device or the processor may employ various devices known to those skilled in the art.

According to an exemplary embodiment of the present invention, the marketability can be enhanced by reducing a start-up time and noise, and an engine start can be prepared within a short time.

Furthermore, the present invention is advantageous in that the time taken to start the engine is reduced by a bidirectional control function of a converter, wherein a separate pre-charging element and/or circuit is not required.

Furthermore, the present invention is advantageous in that the production cost can be reduced because the separate pre-charging element and/or circuit is not required.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a start sequence of an engine for a vehicle, the apparatus comprising:
   the engine;
   a motor configured to start the engine;
   a main switch configured to connect power to the motor or interrupt the power to the supplied to the motor;
   a main battery configured to supply the power to the motor by the main switch;

a converter configured to step up a voltage of the motor by boosting reverse power through a reverse control operation;

an auxiliary battery configured to supply the reverse power; and a converter controller configured to perform a pre-charging operation for a predetermined time period through the reverse control operation in response to an ignition-ON signal being inputted, close the main switch to connect the main battery to the motor electrically when the pre-charging operation is completed and the stepping up the voltage is completed, and operate the motor so that the engine starts in response to a key start signal being inputted after the pre-charging operation has been completed.

2. The apparatus of claim 1, wherein the converter controller includes:

an execution module configured to perform the pre-charging operation;

a determination module configured to determine whether the power provided from the main battery reaches a predetermined reference value after the pre-charging operation has been completed; and a control module configured to close the main switch when the power has reached the predetermined reference value as a result of the determination.

3. The apparatus of claim 1, wherein the motor is coupled to a crankshaft of the engine by a connection device.

4. The apparatus of claim 3, wherein the connection device includes a belt or chain.

5. The apparatus of claim 1, wherein the main battery includes a supercapacitor or a lithium-ion battery, and the auxiliary battery includes a lead acid battery.

6. The apparatus of claim 1, wherein the motor includes an inverter-integrated mild hybrid starter and generator (MHSG).

7. The apparatus of claim 1, wherein the converter includes a bidirectional low voltage direct current-direct current converter (LDC).

8. The apparatus of claim 1, wherein the main switch includes a power relay, a semiconductor switching element, a thyristor, a gate turn-OFT (GTO) thyristor, a triode for alternating current (TRIAC), a silicon controlled rectifier (SCR), or an integrated circuit (IC).

9. The apparatus of claim 1, wherein the reverse control operation includes an operation of stepping up a voltage from 12 V to 48 V.

10. The apparatus of claim 1, further including a vehicle controller configured to verify that the main switch is in a closed state, when the key start signal is inputted after the pre-charging operation has been completed, and operate the motor so that the engine starts.

11. A method for controlling a start sequence of an engine for a vehicle, the method comprising:

performing, by a converter controller, a pre-charging operation for a predetermined time through a reverse control operation in response to an ignition-ON signal being inputted, wherein the reverse control operation includes providing reverse power from an auxiliary battery;

stepping up, by a converter, a voltage to be applied to a motor by boosting the reverse power provided from the auxiliary battery according to the reverse control operation;

closing, by the converter controller, a main switch to connect a main battery to the motor electrically in response to the pre-charging operation being completed and the stepping up the voltage being completed; and supplying power from the main battery to the motor through the main switch to start the engine by operating the motor in response to a key start signal being inputted after the pre-charging operation has been completed.

12. The method of claim 11, wherein the closing of the main switch includes:

determining, by a determination module, whether the power provided from the main battery reaches a predetermined reference value after the pre-charging operation is completed; and closing, by a control module, the main switch then the power has reached the predetermined reference value as a result of the determining.

13. The method of claim 11, wherein the motor is coupled to a crankshaft of the engine by a connection device.

14. The method of claim 13, wherein the connection device includes a belt or a chain.

15. The method of claim 11, wherein the main battery includes a supercapacitor or a lithium-ion battery, and the auxiliary battery includes a lead acid battery.

16. The method of claim 11, wherein the motor includes an inverter-integrated mild hybrid starter and generator (MHSG).

17. The method of claim 11, wherein the converter includes a bidirectional low voltage direct current-direct current converter (LDC).

18. The method of claim 11, wherein the main switch includes a power relay, a semiconductor switching element, a thyristor, a gate turn-OFF(GTO) thyristor, a triode for alternating current (TRIAC), a silicon controlled rectifier (SCR), or an integrated circuit (IC).

19. The method of claim 11, wherein the reverse control operation includes stepping up a voltage from 12 V to 48 V.

20. The method of claim 11, wherein the supplying of the power includes:

checking, by a vehicle controller, that the main switch is in a closed state, when the key start signal is inputted after the pre-charging operation has been completed, and operating the motor so that the engine starts.

* * * * *